United States Patent
Takahashi (12) United States Patent (10) Patent No.: US 7,008,087 B2
(45) Date of Patent: Mar. 7, 2006

(54) TAIL LAMP SUPPORT STRUCTURE FOR VEHICLE FOR UNEVEN GROUND RUNNING

(75) Inventor: Shinji Takahashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 109 days.

(21) Appl. No.: 10/733,409

(22) Filed: Dec. 12, 2003

(65) Prior Publication Data

US 2004/0170027 A1   Sep. 2, 2004

(30) Foreign Application Priority Data

Dec. 27, 2002  (JP) .............................. 2002-381247

(51) Int. Cl.
  *B62J 6/04*   (2006.01)
(52) U.S. Cl. ...................... 362/473; 362/506
(58) Field of Classification Search ............... 362/473, 362/505, 506, 507, 540, 541, 543, 549
See application file for complete search history.

(56) References Cited

U.S. PATENT DOCUMENTS

| | | | | |
|---|---|---|---|---|
| 2,106,992 A | * | 2/1938 | Bahr | 362/487 |
| 2,758,401 A | * | 8/1956 | Wilson | 40/579 |
| 6,547,426 B1 | * | 4/2003 | Ebara | 362/473 |

* cited by examiner

*Primary Examiner*—Y. My Quach-Lee
(74) *Attorney, Agent, or Firm*—Birch, Stewart, Kolasch & Birch, LLP (57) ABSTRACT

In a vehicle for uneven ground operation in which rear wheels are covered from above with respective rear fenders and respective mud guards attached to the rear fenders. Respective tail lamps are disposed adjacent to the rear fenders with the tail lamps being supported by the mud guards. Projecting and depressed portions formed on each of the mud guards to prevent interference with the tail lamp are no longer necessary so that the mud guard is molded easily. Even if there is an interference with the tail lamp during driving, the flexible mud guard is warped so that an impact on the tail lamp from the outside is prevented. Since the tail lamp is not mounted on the fender, the configuration of the fender can be simplified and cost can be reduced.

17 Claims, 9 Drawing Sheets

FIG. 9
CONVENTIONAL ART

TAIL LAMP SUPPORT STRUCTURE FOR VEHICLE FOR UNEVEN GROUND RUNNING

CROSS-REFERENCE TO RELATED APPLICATIONS

The present application claims priority under 35 USC 119 to Japanese Patent Application No. 2002-381247 filed on Dec. 27, 2002 the entire contents thereof is hereby incorporated by reference.

BACKGROUND OF THE INVENTION

1. Field of the Invention

The present invention relates to a tail lamp support structure for a vehicle for uneven ground operation which reduces the cost for components around a tail lamp and prevents an impact on the tail lamp from the outside.

2. Description of Background Art

As a tail lamp support structure for a vehicle for uneven ground operation, there has been known one which supports a tail lamp by using a rear fender, see, e.g., Japanese Examined Utility Model Publication No. HEI 5-11084, Page 2, FIG. 1.

A first drawing of Japanese Examined Utility Model Publication No. HEI 5-11084 will be described with reference to FIG. 8 of the present specification herein below. It is to be noted that reference numerals have been reassigned.

Figure 8:
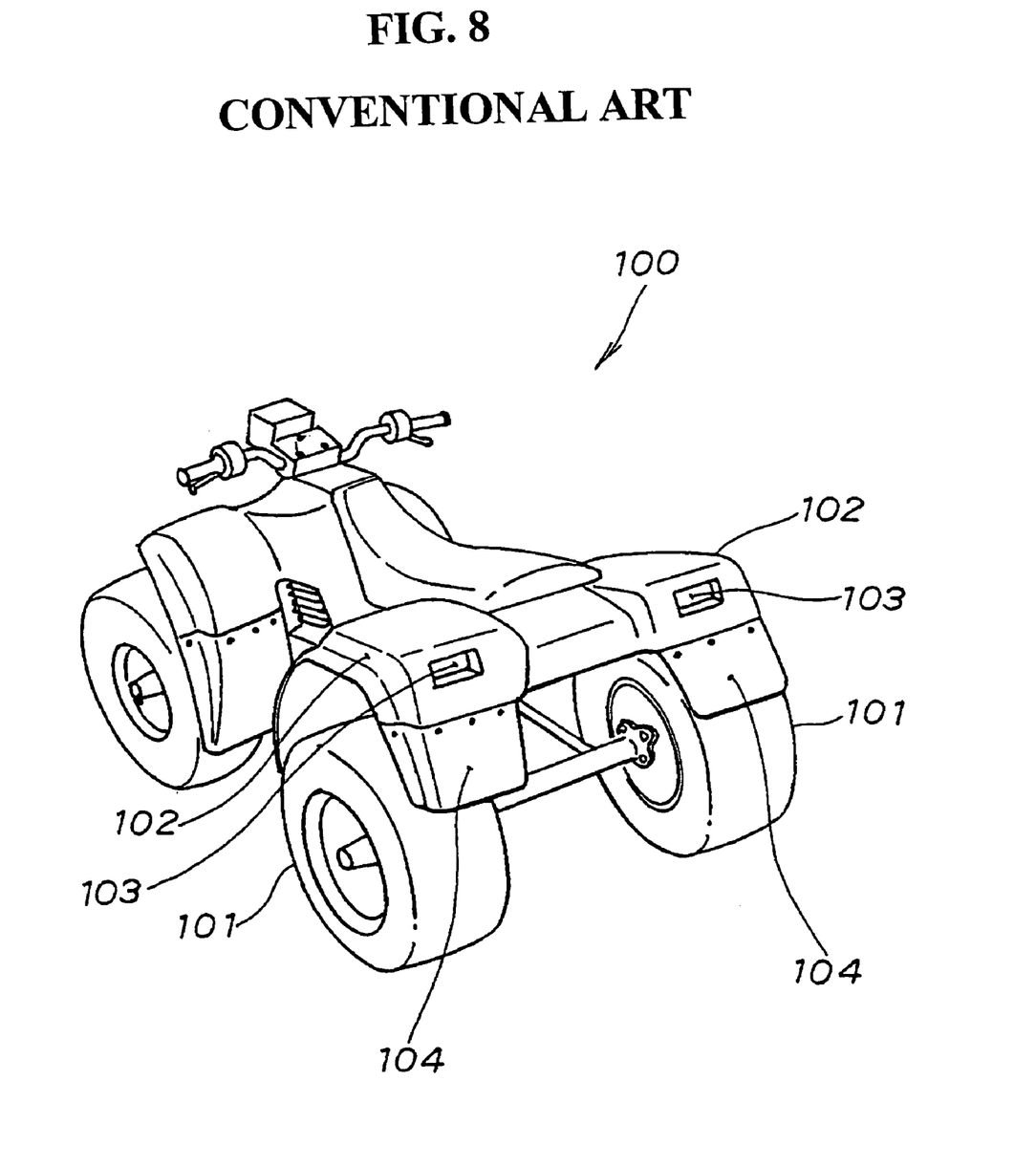
FIG. 8 is a perspective view of a conventional vehicle for uneven ground operation.

FIG. 8 is a perspective view of a conventional vehicle for uneven ground operation. In a vehicle 100 for uneven ground operation, left and right rear wheels 101 and 101 are covered from above with respective rear wheel fenders 102 and 102. Tail lamps 103 and 103 are mounted on the respective rear portions of the rear wheel fenders 102 and 102, while mud guards 104 and 104 are attached to the respective lower rear portions of the rear wheel fenders 102 and 102.

Figure 9:
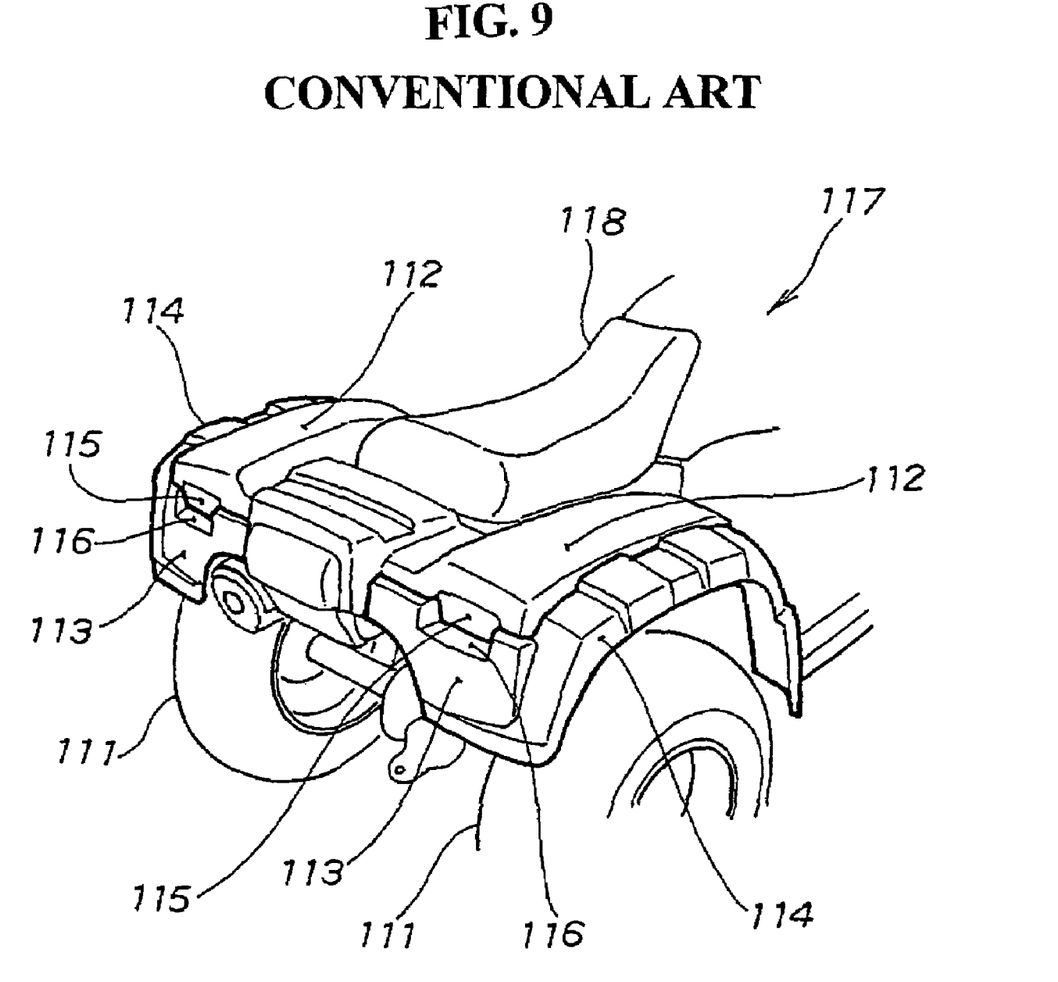
FIG. 9 is a rear-portion perspective view of a conventional vehicle for uneven ground operation.

A tail lamp support structure for a vehicle for uneven ground operation is also known as shown in FIG. 9.

FIG. 9 is a rear-portion perspective view of a conventional vehicle for uneven ground operation. A vehicle 117 is illustrated wherein respective rear fenders 112 and 112 are provided above rear wheels 111 and 111. An over fender 114 is integrally formed with a mud guard 113 attached to the side and rear portions of each of the rear fenders 112 and 112. Respective tail lamps 115 and 115 are attached to the rear fenders 112 and 112, and the over fenders 114 are formed with notched portions 116 for preventing the tail lamps 115 and 115 from being covered therewith. A seat 118 is provided on the body frame.

In FIG. 8, the rear wheel fenders 102 are large-size resin members each of which is molded in a mold. If the configuration of the mold is simplified by simplifying the configuration of the rear wheel fender 102, e.g., if the tail lamp 103 can be mounted on another component, the mold can be manufactured easily so that cost for the mold is reduced.

Since the vehicle 100 for uneven ground operation also runs in a wilderness, a timberland, or the like, a collision from a projection onto the tail lamp 103 from the outside is also expected. To protect the tail lamp, the attachment of, e.g., a net-like guard for covering the tail lamp 103 may be considered. However, the attachment of such a guard leads to an increase in cost and an increase in the weight of the body.

Since each of the over fenders 114 is provided with the notched portion 116 in FIG. 9, the configuration is complicated so that the cost for the mold of the over fender 114 is increased.

SUMMARY AND OBJECTS OF THE INVENTION

It is therefore an object of the present invention to achieve reductions in the cost for components (fenders and mudguards) around tail lamps and reductions in the cost for the molds of these components by improving a tail lamp support structure for a vehicle for uneven ground operation while preventing an impact on the tail lamp from the outside.

To attain the object described above, a vehicle for uneven ground operation is provided in which left and right rear wheels are suspended from a body frame via a suspension, these rear wheels are covered from above with respective fenders, and a mud guard is attached to each of these fenders, while a tail lamp is disposed adjacent the fender, the tail lamp is supported by the mud guard.

Since the tail lamp is supported by the mud guard, projecting and depressed portions which have been formed conventionally on the mud guard attached to the fender to circumvent, when the tail lamp is mounted on the fender, interference with the tail lamp are no longer necessary according to the present invention.

The mud guard is adapted to have flexibility such that no impact is exerted thereon even if a projection from a road surface interferes with the mud guard. In this arrangement, even if the tail lamp mounted on the mud guard undergoes any interference during driving, the mud guard is warped to reduce the impact of the interference so that the impact on the tail lamp from the outside is prevented.

Since the tail lamp is not mounted on the fender, the configuration of the mold of the fender is further simplified. This allows easy manufacturing of the mold and a reduction in the cost for the mold.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring to the accompanying drawings, the embodiments of the present invention will be described herein below. It is assumed that the drawings are viewed from a direction facing the reference numerals.

Figure 1:
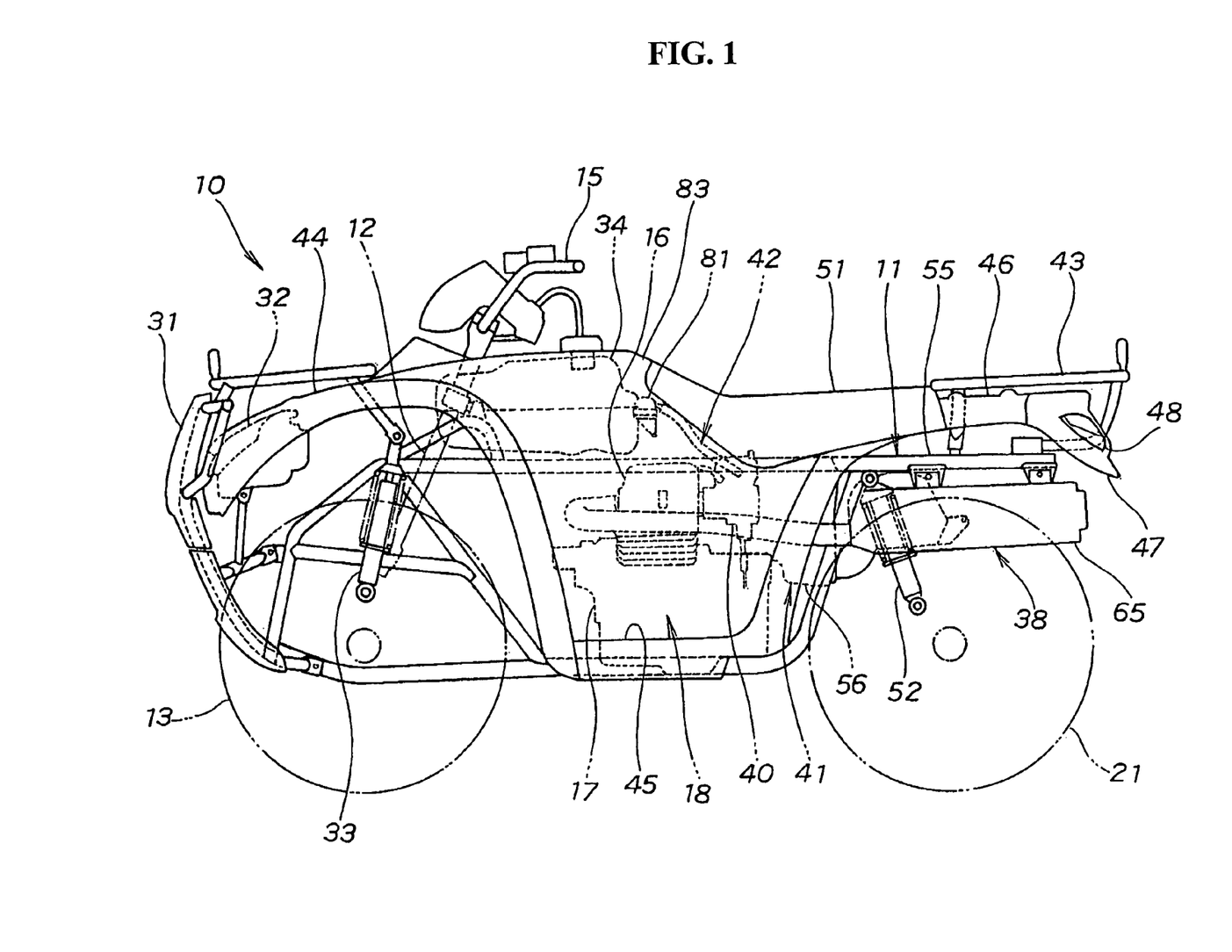
FIG. 1 is a side view of a vehicle using a tail lamp support structure according to the present invention.

FIG. 1 is a side view of a vehicle using a tail lamp support structure according to the present invention. A vehicle 10 is a vehicle for uneven ground operation in which a steering shaft 12 is mounted on the front portion of a body frame 11 with the lower end portion of the steering shaft 12 being coupled to left and right front wheels 13 and 14 (only the anterior front wheel 13 is shown). A handle 15 is mounted on the upper end portion of the steering shaft 12. A power unit 18 including an engine 16 and a transmission 17 is mounted on the middle portion of the body frame 11 with rear wheels 21 and 22 (only the anterior rear wheel 21 is shown) driven together with the front wheels 13 and 14 by the power unit 18 are disposed in the rear portion of the body frame 11.

A front guard 31 is provided for protecting the front face of the body with head lamps 32 and 32 (only the anterior reference numeral 32 is shown). Shock absorbers 33 and 33 (only one of the reference numerals is shown) are provided for the front wheels 13 and 14. A fuel tank 34 is mounted on the body frame 11. An exhaust unit 38 is connected to the front portion of the engine 16 and bent and extended rearwardly with a carburetor 40 connected to the rear portion of the engine 16 and an air cleaner unit 41 coupled to the rear portion of the carburetor 40. An air vent unit 42 is provided for exerting an atmospheric pressure on a level of the fuel in a float chamber provided in the carburetor 40. A rear carrier 43 is provided for carrying luggage. Front fenders 44 and 44 (only the anterior reference numeral 44 is shown) are provided for covering the front wheels 13 and 14 from above and from behind. A step 45 and 45 (only the anterior reference numeral 45 is shown) is provided on which a driver may rest his or her legs. Rear fenders 46 and 46 (only the anterior reference numeral 46 is shown) are provided for covering the rear wheels 21 and 22 from the front and from above with mud guards 47 and 47 (only the anterior reference numeral 47 is shown) attached to the rear fenders 46 and 46. Tail lamps 48 and 48 (only the anterior reference numeral 48 is shown) are attached to the mud guards 47 and 47. A seat 51 is mounted to the body frame 11. Shock absorbers 52 and 52 (only the anterior reference numeral 52 is shown) are provided for the rear wheels 21 and 22.

Figure 2:
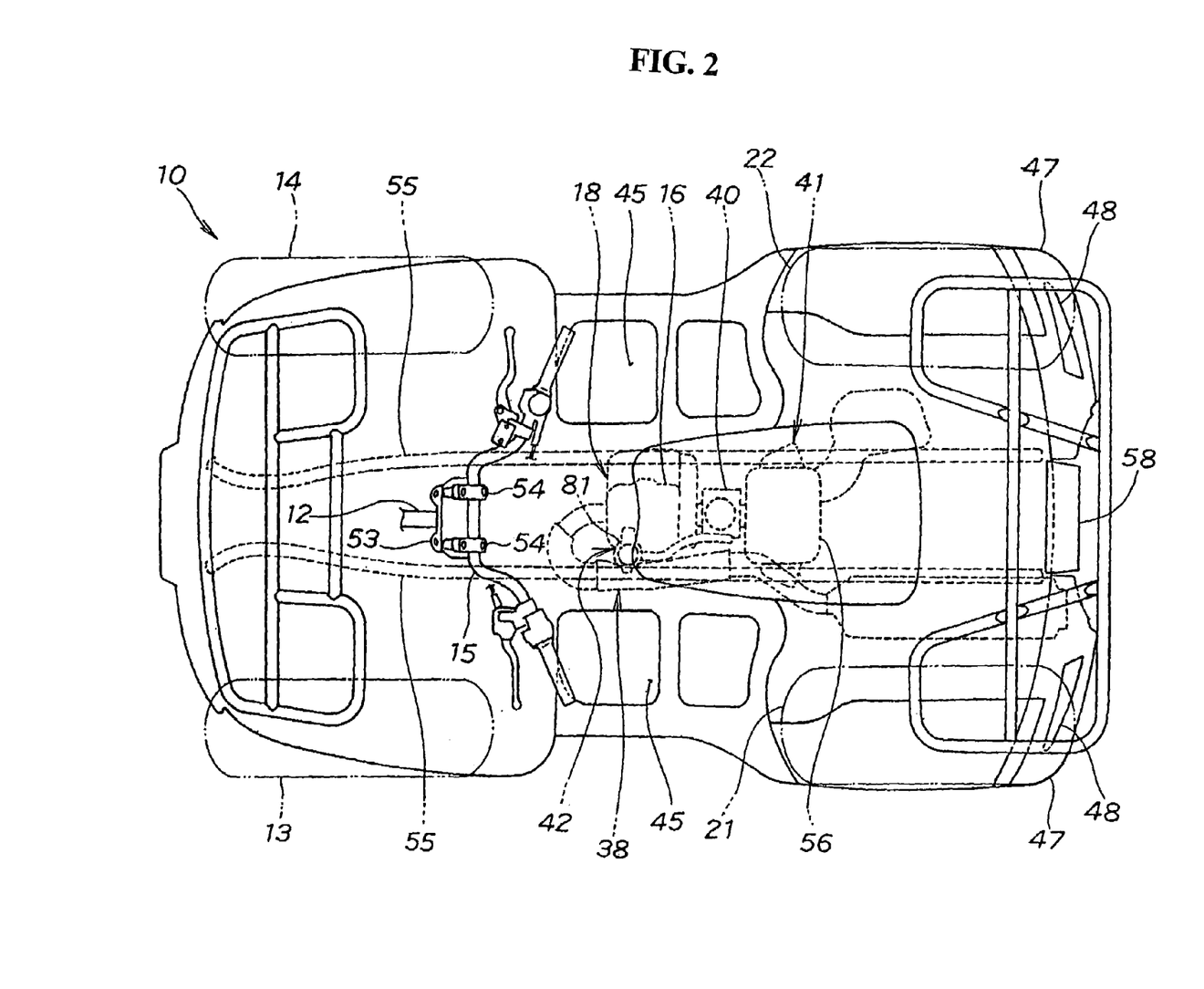
FIG. 2 is a plan view of a vehicle according to the present invention.

FIG. 2 is a plan view of the vehicle according to the present invention, which shows that left and right main frames 55 and 55 composing a part of the body frame 11 are disposed at the center portion of the body to extend in a front-to-rear direction. The power unit 18, the carburetor 40, and a main air cleaner 56 composing the air cleaner unit 41 are disposed between the main frames 55 and 55. The exhaust unit 38 is bent into a U-shaped configuration from the engine 16 and extends rearwardly.

It is also shown that a handle support member 53 is mounted on the upper portion of the steering shaft 12 and the handle 15 is mounted on the handle support member 53 via handle picking members 54 and 54.

It is further shown that the mud guards 47 and 47 are disposed on the left and right portions of the body with a license plate 58 interposed therebetween.

Figure 3:
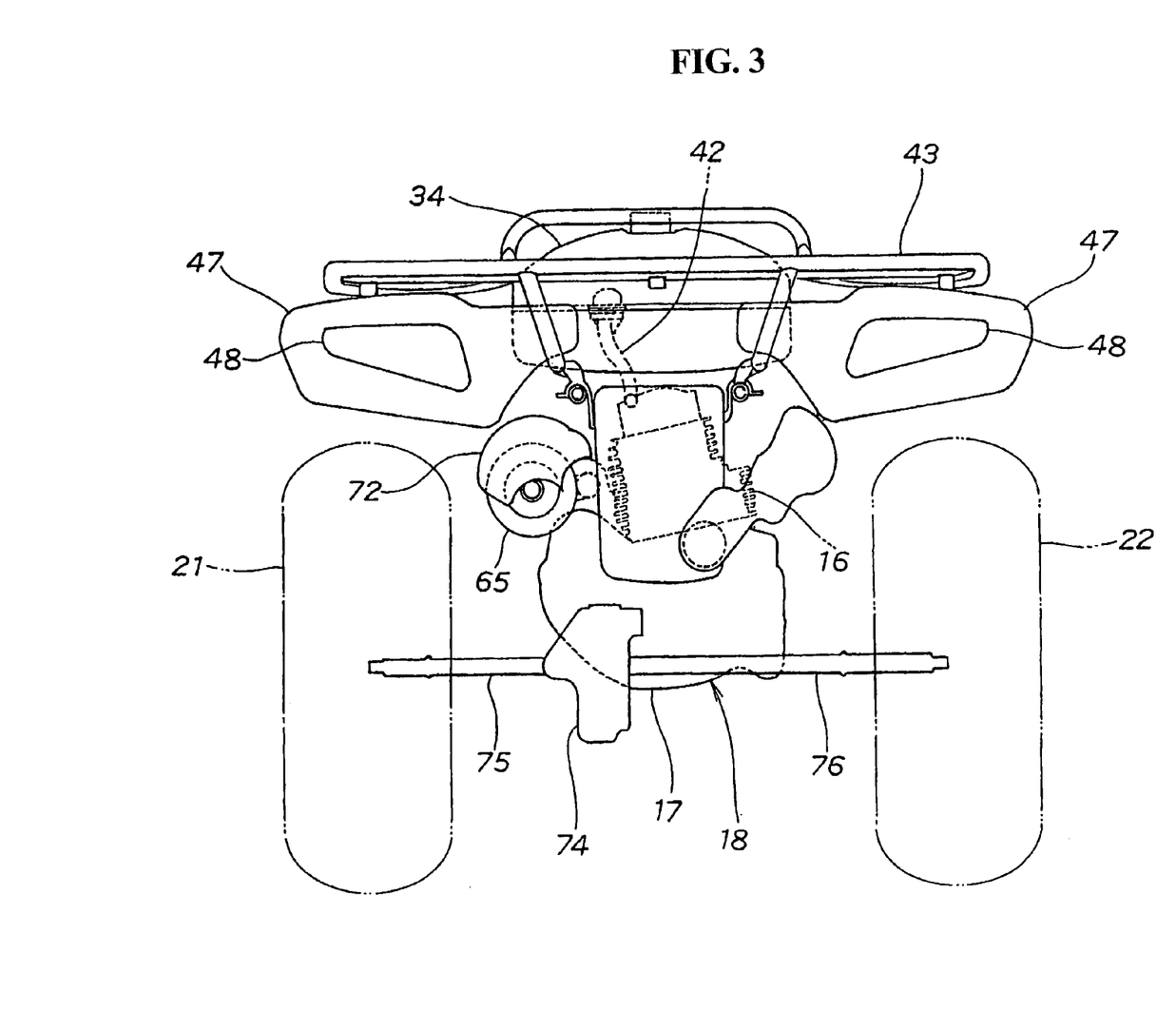
FIG. 3 is a rear view of the vehicle according to the present invention.

FIG. 3 is a rear view of the vehicle according to the present invention, which illustrates the tail lamp 48 disposed substantially at the center of each of the mud guards 47 and 47 with the air vent unit 42 extending upwardly from the carburetor 40, see FIG. 1. In the drawing, a heat shielding plate 72 is provided for covering the upper and side portions of a silencer 65 composing the exhaust unit 38. A final reduction gear unit 74 is provided for the rear wheels 21 and 22 with respective axle shafts 75 and 76 extending from the final reduction gear unit 74 toward the left and right rear wheels 21 and 22 to transmit power to the rear wheels 21 and 22.

Figure 4:
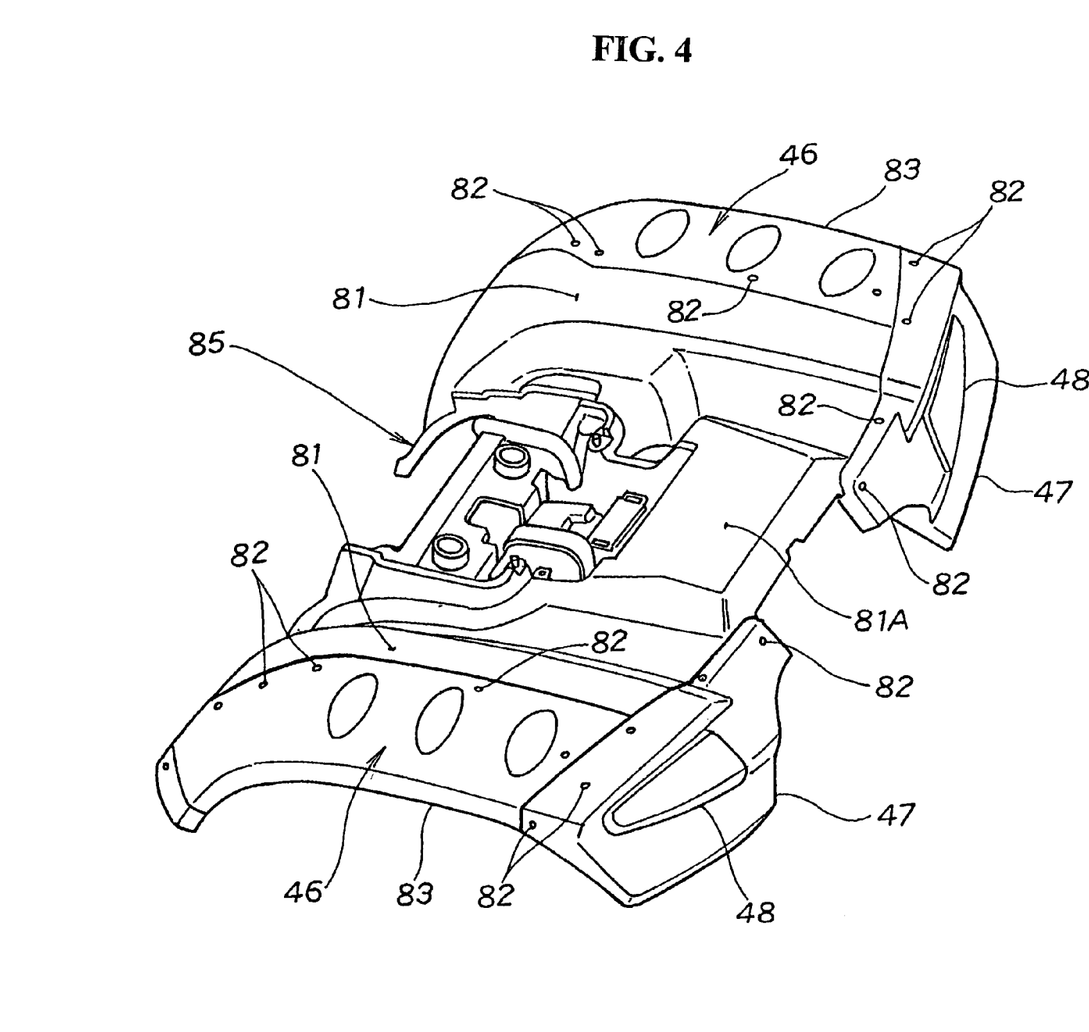
FIG. 4 is a first perspective view illustrating the tail lamp support structure according to the present invention.

FIG. 4 is a first perspective view illustrating the tail lamp support structure according to the present invention, which shows a state in which the mud guard 47 has been attached to each of the left and right rear fenders 46 and 46.

The rear fender 46 is composed of a fender main body 81 and an over fender 83 attached to the side portion of the fender main body 81 with a plurality of screws 82. The over fender 83 has been attached to the fender main body 81 by using the screws 82, while the rear portion of each of the fender main body 81 and the over fender 83 is covered with the mud guard 47.

The left and right fender main bodies 81 and 81 are portions molded integrally with a fender center portion 81A disposed therebetween.

These fender main bodies 81 and 81 and the fender center portion 81A constitute a rear fender molded body 85.

Figure 5:
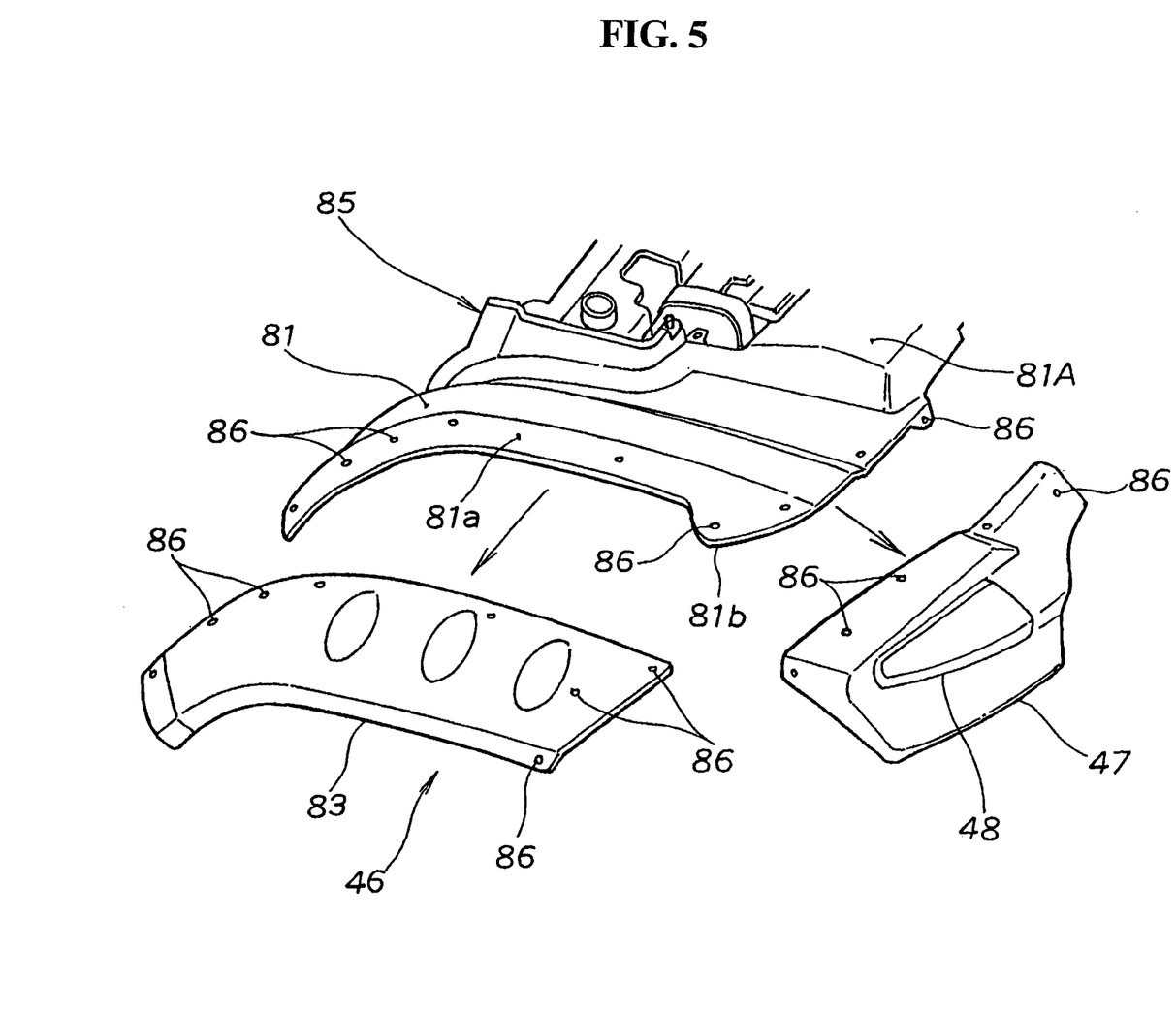
FIG. 5 is an exploded perspective view of a rear fender and a mud guard according to the present invention.

FIG. 5 is an exploded perspective view of the rear fender and the mud guard according to the present invention, which shows that the mud guard 47 has been detached from the fender main body 81 and from the over fender 83 and that the over fender 83 has been detached from the fender main body 81. Here, 86 denote a plurality of screw insertion holes for allowing the passage of the screws 82 therethrough.

The fender main body 81 comprises a protruding portion 81a and an expanded portion 81b expanded sideways from the rear portion of the protruding portion 81a for the attachment of the over fender 83 thereto.

Figure 6:
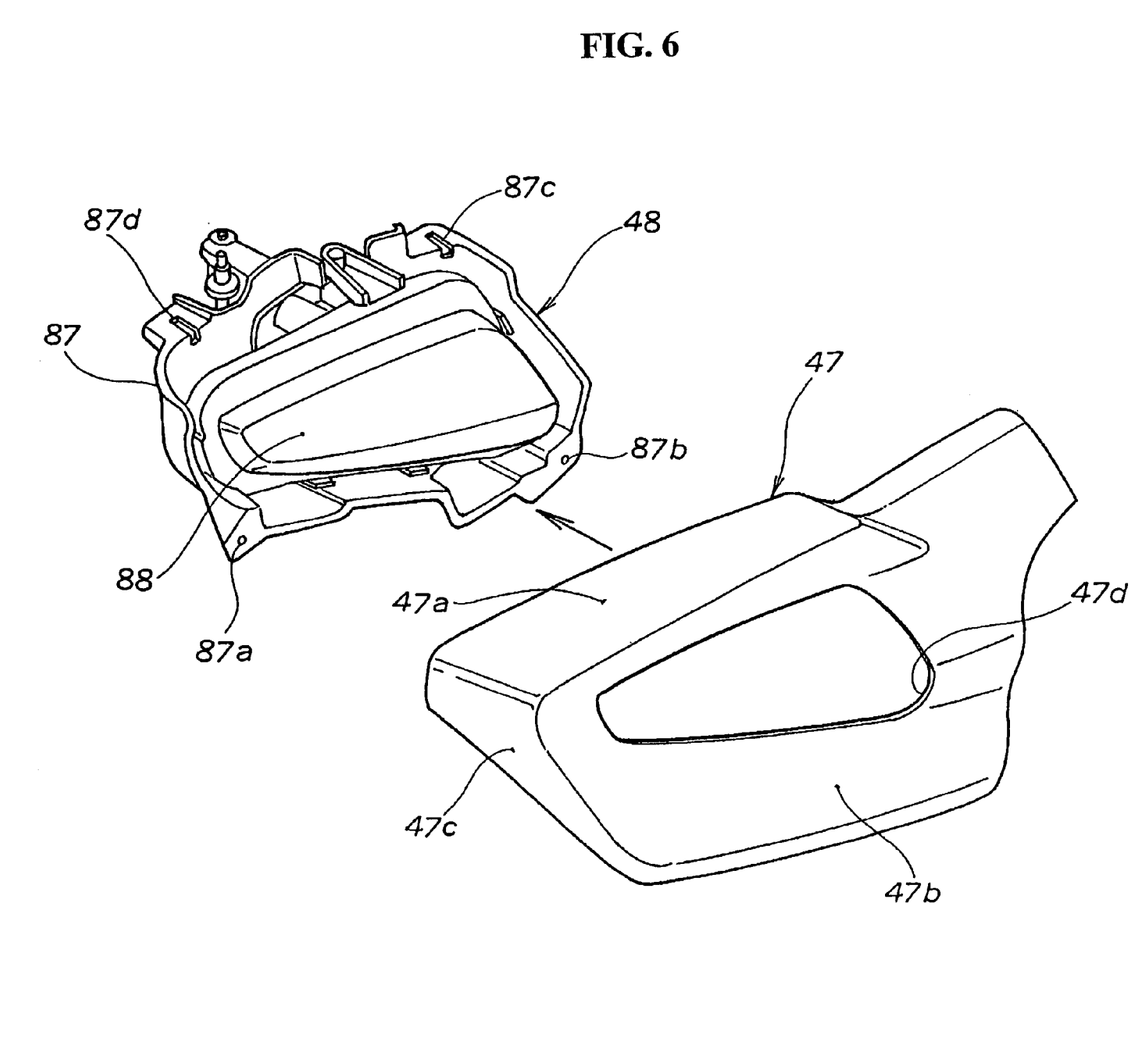
FIG. 6 is a second perspective view illustrating the tail lamp support structure according to the present invention.

FIG. 6 is a second perspective view illustrating the tail lamp support structure according to the present invention, which shows a state in which the tail lamp 48 has been detached from the mud guard 47.

The tail lamp 48 is composed of a housing 87 on which a reflector and an electric lamp have been mounted and a lens 88 mounted on the housing 87. Mounting holes 87a, 87b, 87c, and 87d are provided in the housing 87 for the mounting of the tail lamp 48 on the mud guard 47 and on the rear fender 46, see FIG. 5.

The mud guard 47 is composed of an upper extended portion 47a for covering the rear end portion of the rear fender 46, a rear extended portion 47b extending rearwardly and obliquely downwardly from the rear end of the upper extended portion 47a, and a side extended portion 47c provided on the respective side portions of the upper extended portion 47a and the rear extended portion 47b. The rear extending portion 47b has a lens insertion hole 47d for the insertion of the lens 88 of the tail lamp 48.

Figure 7:
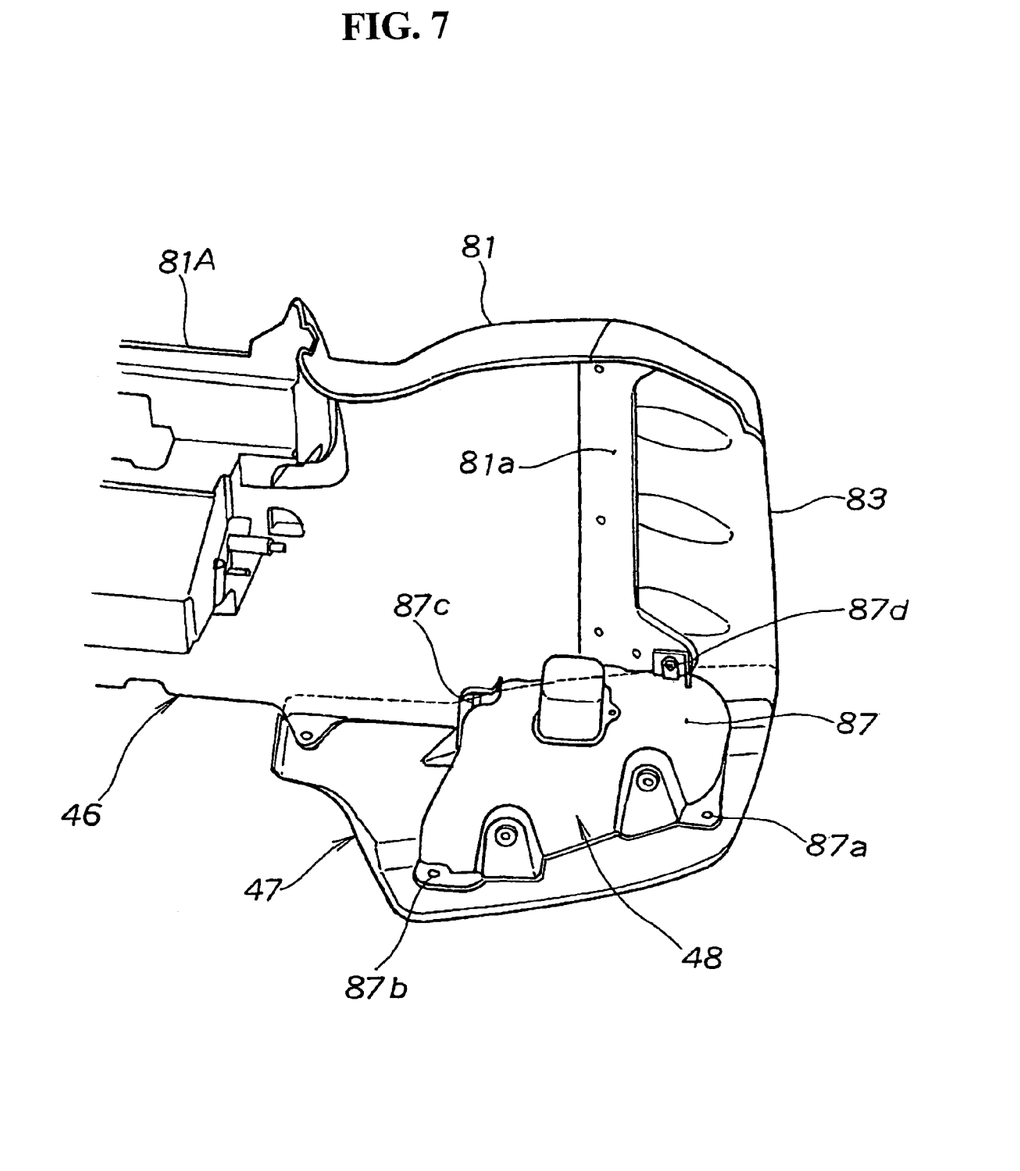
FIG. 7 is a third perspective view illustrating the tail lamp support structure according to the present invention.

FIG. 7 is a third perspective view illustrating the tail lamp support structure according to the present invention, which is a view when the rear fender 46 and the mud guard 47 are viewed from the back surface thereof.

The tail lamp 48 has been mounted on the mud guard 47 with the screws 82, see FIG. 4, through the mounting holes 87a and 87b and on the fender main body 81 with the screws 82 through the mounting holes 87c and 87d.

By thus mounting the tail lamp 48 on the flexible mud guard 47 and on the rear fender 46, the rigidity of the mud guard 47 can be set to a relatively high value. In the case of a collision with the tail lamp 48, an impact on the tail lamp can be prevented and the vibration of the tail lamp 48 can be suppressed.

As described above with reference to FIGS. 1 and 2, the present invention is directed to a vehicle for uneven ground operation in which the left and right rear wheels 21 and 22 are suspended from the body frame 11 via a suspension. These rear wheels 21 and 22 are covered from above with the respective rear fenders 46 and 46, and the respective mud guards 47 and 47 are attached to the rear fenders 46 and 46, while the tail lamps are disposed adjacent the rear fenders 46 and 46, the tail lamps 48 and 48 are supported by the mud guards 47 and 47.

Since the tail lamps 48 and 48 are supported by the mud guards 47 and 47, projecting and depressed portions which have been formed conventionally on the mud guards attached to the fenders to circumvent, when the tail lamps are mounted on the fenders, interference with the tail lamps are no longer necessary according to the present invention. This allows for an easy molding of the mud guard 47 and a reduction in the cost of the mud guard 47.

The mud guard 47 is adapted to have flexibility such that no impact is exerted thereon even if a projection from a road surface interferes with the mud guard. In the arrangement, even if the tail lamp 48 mounted on the mud guard 47 undergoes any interference during driving, the mud guard 47 is warped to reduce the impact of the interference so that the impact on the tail lamp 48 from the outside is prevented. If the tail lamp 48 is mounted on the mud guard 47, on the other hand, the rigidity of the mud guard 47 becomes relatively high and the mud guard 47 is less likely to vibrate so that sound generation is prevented.

Since the tail lamp 48 is not mounted on the rear fender 46, the configuration of the mold of the large-size rear fender 46 made of a resin is further simplified. This allows easy manufacturing of the mold of the rear fender and a reduction in the cost for the mold.

The present invention achieves the following effect with the foregoing structures.

In the tail lamp support structure for a vehicle for uneven ground operation, the tail lamp is supported by the mud guard. Consequently, projecting and depressed portions which have been formed conventionally on the mud guard attached to the fender to circumvent, when the tail lamp is mounted on the fender, interference with the tail lamp are no longer necessary according to the present invention. This allows easy molding of the mud guard and a reduction in the cost for the mud guard.

The mud guard is adapted to have flexibility such that no impact is exerted thereon even if a projection from a road surface interferes with the mud guard. In the arrangement, even if the tail lamp mounted on the mud guard undergoes any interference during driving, the mud guard is warped to reduce the impact of the interference so that the impact on the tail lamp from the outside is prevented.

Since the tail lamp is not mounted on the fender, the configuration of the mold of the fender is further simplified. This allows easy manufacturing of the mold of the fender and a reduction in the cost for the mold.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tail lamp support structure for a vehicle for uneven ground operation in which left and right rear wheels are suspended from a body frame via a suspension, these rear wheels are covered from above with respective rear fenders comprising:
   a mud guard attached to each of the rear fenders; and
   a tail lamp disposed adjacent to each of the rear fenders;
   wherein said tail lamp is supported by said mud guard, and
   wherein said mud guard includes an upper extending portion for covering a rear portion of the rear fender, a rear extending portion extending rearwardly and obliquely downwardly from the rear end of the upper extending portion and a side extending portion provided on the respective side portions of the upper extending portion and the rear extending portion.

2. The tail lamp support structure for a vehicle according to claim 1, and further including an over fender wherein said over fender is secured to said mud guard and said rear fender.

3. The tail lamp support structure for a vehicle according to claim 2, wherein said rear fenders include a protruding portion and an expanded portion for attachment of the over fender thereto.

4. The tail lamp support structure for a vehicle according to claim 1, wherein the rear extending portion includes a lens insertion hole for the insertion of a lens of the tail lamp.

5. The tail lamp support structure for a vehicle according to claim 1, wherein the mud guard is flexible for accommodating a collision with an object during operation of the vehicle without adversely affecting the tail lamp.

6. The tail lamp support structure for a vehicle according to claim 5, wherein the flexible mud guard suppresses vibration of the tail lamp.

7. The tail lamp support structure for a vehicle according to claim 1, wherein the mud guard is molded to include an aperture for accommodating the tail lamp.

8. The tail lamp support structure for a vehicle according to claim 1, wherein the rear fenders include a main body that is molded to provide a support for attaching the mud guard to the main body.

9. The tail lamp support structure for a vehicle according to claim 8, and further including an over fender that is molded for readily being attached to the main body.

10. A lamp support structure for a vehicle comprising:
    a fender main body having a first side and a second side;
    a mud guard attached to each of said first and second sides of the fender main body; and
    a lamp mounted within said mud guard and being disposed adjacent to each of the first and second sides of the fender main body,
    an over fender secured to said mud guard and said fender main body,
    wherein said fender main body includes a protruding portion and an expanded portion for attachment of the over fender thereto.

11. The lamp support structure for a vehicle according to claim 10, wherein said mud guard includes an upper extending portion for covering a rear portion of the rear fender, a rear extending portion extending rearwardly and obliquely downwardly from the rear end of the upper extending portion and a side extending portion provided on the respec tive side portions of the upper extended portion and the rear extending portion.

12. The lamp support structure for a vehicle according to claim 11, wherein the rear extending portion includes a lens insertion hole for the insertion of a lens of the lamp.

13. The lamp support structure for a vehicle according to claim 10, wherein the mud guard is flexible for accommodating a collision with an object during operation of the vehicle without adversely affecting the lamp.

14. The lamp support structure for a vehicle according to claim 13, wherein the flexible mud guard suppresses vibration of the lamp.

15. The lamp support structure for a vehicle according to claim 10, wherein the mud guard is molded to include an aperture for accommodating the lamp.

16. The lamp support structure for a vehicle according to claim 10, wherein the fender main body is molded to provide a support for attaching the mud guard to the main body.

17. The lamp support structure for a vehicle according to claim 16, wherein the over fender is molded for readily being attached to the fender main body.

* * * * *